United States Patent
Ying (10) Patent No.: US 12,005,683 B2
(45) Date of Patent: Jun. 11, 2024

(54) COMPOSITE LAYER STRUCTURE, DECORATED MOLDING ARTICLE AND METHOD FOR FABRICATING THE SAME

(71) Applicant: KIMI SAWA ENTERPRISE LIMITED, Kowloon (HK)

(72) Inventor: Kuo-Liang Ying, Taoyuan (TW)

(73) Assignee: KIMI SAWA ENTERPRISE LIMITED, Kowloon (HK)

( * ) Notice: Subject to any disclaimer, the term of this patent is extended or adjusted under 35 U.S.C. 154(b) by 46 days.

(21) Appl. No.: 17/864,422

(22) Filed: Jul. 14, 2022

(65) Prior Publication Data
US 2022/0347985 A1 Nov. 3, 2022

Related U.S. Application Data

(62) Division of application No. 16/396,780, filed on Apr. 29, 2019, now abandoned.

(30) Foreign Application Priority Data

Jul. 31, 2018 (TW) ................................. 107126457

(51) Int. Cl.
*B32B 27/08* (2006.01)
*B29C 45/14* (2006.01)
(Continued)

(52) U.S. Cl.
CPC ........ *B32B 27/08* (2013.01); *B29C 45/14688* (2013.01); *B29C 48/08* (2019.02);
(Continued)

(58) Field of Classification Search
CPC .......... B32B 2037/243; B32B 2250/02; B32B 2250/05; B32B 2250/246; B32B 2307/402; B32B 2307/4023; B32B 2307/4026; B32B 2307/406; B32B 2307/408; B32B 2307/409; B32B 2307/412; B32B 2307/416; B32B 2307/514; B32B 2307/536; B32B 2307/54; B32B 2307/75; B32B 2451/00; B32B 2457/00; B32B 2605/003; B32B 27/08; B32B 27/20; B32B 27/302; B32B 27/308; B32B 37/02;
(Continued)

(56) References Cited

U.S. PATENT DOCUMENTS

2003/0125465 A1\* 7/2003 Koyama ............. C08L 23/0815
525/232
2005/0008884 A1\* 1/2005 Kappacher ............ B32B 27/308
428/483

FOREIGN PATENT DOCUMENTS

DE 0283861 A2 \* 9/1989

OTHER PUBLICATIONS

Machine translation of EP0283861, Geppert et al, Sep. 28, 1988 (Year: 1988).\*

\* cited by examiner

*Primary Examiner* — Frances Tischler
(74) *Attorney, Agent, or Firm* — JCIPRNET (57) ABSTRACT

Provided is a composite layer structure comprising a first layer and a second layer. The second layer is disposed on the first layer. A material of the second layer is different from a material of the first layer. The composite layer structure is formed by a co-extrusion molding film process, and the composite layer structure has a thickness of between 0.01 mm and 1 mm. Further, the present invention also provides a decorated molding article and a method for fabricating the same.

9 Claims, 4 Drawing Sheets

(51) Int. Cl.
  *B29C 48/08* (2019.01)
  *B29C 48/21* (2019.01)
  *B29C 51/10* (2006.01)
  *B32B 7/12* (2006.01)
  *B32B 27/20* (2006.01)

(52) U.S. Cl.
  CPC .............. *B29C 48/21* (2019.02); *B29C 51/10* (2013.01); *B32B 7/12* (2013.01); *B32B 27/20* (2013.01); *B29C 2045/14696* (2013.01); *B29C 2045/14713* (2013.01); *B32B 2250/02* (2013.01); *B32B 2250/05* (2013.01); *B32B 2307/402* (2013.01); *B32B 2307/412* (2013.01); *B32B 2451/00* (2013.01)

(58) Field of Classification Search
  CPC ............ B32B 7/12; B29C 2045/14696; B29C 2045/14713; B29C 45/14688; B29C 45/14786; B29C 48/08; B29C 48/21; B29C 51/10
  See application file for complete search history.

COMPOSITE LAYER STRUCTURE, DECORATED MOLDING ARTICLE AND METHOD FOR FABRICATING THE SAME

CROSS-REFERENCE TO RELATED APPLICATION

This application is a divisional application of and claims the priority benefit of U.S. application Ser. No. 16/396,780, filed on Apr. 29, 2019, now pending, which claims the priority benefit of Taiwan application serial no. 107126457, filed on Jul. 31, 2018. The entirety of each of the above-mentioned patent applications is hereby incorporated by reference herein and made a part of this specification.

BACKGROUND

Technical Field

The present invention relates to a composite layer structure, a decorated molding article, and a method for fabricating the same.

Description of Related Art

In general, patterns or texts formed on an outer surface of a housing of an object are mainly formed by a spraying or printing process, so as to present specific visual effects and add variability to the appearance of the object. The conventional method for forming such patterns or texts is to apply a hardened layer on the outer surface of the housing by spraying after a housing of a related product has been accomplished. This method is cumbersome, has poor yields, and causes pollutions of gaseous organic solvents, thus resulting in numerous environmental issues. On the other hand, since the spraying process has disadvantages such as time consumption, complicate processing, and low thickness uniformity, it is not suitable for application in large scale production.

To address the aforementioned issues, various decoration processes using decorative films are proposed. For example, in-mold decoration (IMD) or out mold decoration (OMD) has become another choice to form the patterns or texts on a surface of an object.

At present, polymeric materials commonly used in IMD include polycarbonate (PC), poly (methyl methacrylate) (PMMA), also known as polyacrylate, polyethylene terephthalate (PET), and acrylonitrile butadiene styrene copolymer (ABS). However, the hardness of a base material composed of PC and ABS is low, so that a surface of the substrate is liable to be damaged. A protective layer is therefore applied thereon to enhance the hardness and scratch resistance of the surface of the base material. On the other hand, a base material composed of PMMA has high hardness but is easily cracked during molding. Thus it is difficult to perform a heat pressurizing process thereto.

SUMMARY

The invention provides a composite layer structure which has both high hardness and high tensile properties. The composite layer structure provides the appearance of highlight gloss, lusterless matte and various geometrically textured effects and is suitable for subsequent in-mold decoration or out mold decoration.

The invention provides a method for fabricating a decorated molding article, which may conduct a dyeing process during the formation of the composite layer structure. Therefore, the composite layer structure may achieve decorative effects without an additional printing process, so as to reduce the costs and improve the yields.

The invention provides a composite layer structure. The composite layer structure includes a first layer and a second layer. The second layer is disposed on the first layer. A material of the second layer is different from a material of the first layer. The composite layer structure is formed by a co-extrusion molding film process, and the composite layer structure has a thickness of between 0.01 mm and 1 mm.

In an embodiment of the invention, the material of the first layer includes acrylonitrile butadiene styrene copolymer (ABS), polycarbonate (PC), polypropylene (PP), polyurethane (PU), acrylonitrile butadiene styrene copolymer (ASA), acrylonitrile-styrene copolymer (SAN), methyl methacrylate acrylonitrile butadiene styrene copolymer (MABS), polystyrene (PS), methyl methacrylate styrene copolymer (MS), or a combination thereof.

In an embodiment of the invention, the material of the second layer includes poly(methyl methacrylate) (PMMA), polycarbonate, polypropylene, polyurethane, acrylonitrile styrene acrylate rubber copolymer (ASA), acrylonitrile-styrene copolymer (SAN), methacrylate acrylonitrile butadiene styrene copolymer (MABS), polystyrene (PS), methyl methacrylate styrene copolymer (MS), or a combination thereof.

In an embodiment of the invention, a mixed region is included between the first layer and the second layer, the mixed region comprises both of the material of the first layer and the material of the second layer.

In an embodiment of the invention, the first layer, the second layer or both of the layers further include a color concentrate, a pigment, a pearl powder or a combination thereof, so that the composite layer structure has colorful, pearlescent, glossy, mirror-like or other visual effects.

In an embodiment of the invention, the composite layer structure is a transparent composite layer structure.

The invention provides a decorated molding article. The decorated molding article includes a workpiece and the composite layer structure as described above. The composite layer structure is attached onto an outer surface of the workpiece via an adhesive layer.

In an embodiment of the invention, the decorated molding article further includes a decorative layer disposed between the decorated molding article and the adhesive layer.

In an embodiment of the invention, a material of the outer surface of the workpiece comprises plastics, resin, metal, carbon fiber, glass, or a combination thereof.

In an embodiment of the invention, the workpiece comprises a housing or component of an electronic device, a housing or component of a vehicle, or a combination thereof; and the housing or component of the vehicle comprises an automotive interior decoration, an automotive exterior decoration, an automotive logo, an automotive dashboard, an intelligent key (I-key), an engine start button or a combination thereof.

The invention provides a method for fabricating a decorated molding article. The method includes the steps of: providing a first material to a first screw of a co-extrusion blow molding machine; providing a second material to a second screw of the co-extrusion blow molding machine; and performing a co-extrusion molding film process, so that the first material and the second material are extruded to form a composite layer structure. The first material is different from the second material.

In an embodiment of the invention, the first material includes acrylonitrile butadiene styrene copolymer (ABS), polycarbonate (PC), polypropylene (PP), polyurethane (PU), acrylonitrile butadiene styrene copolymer (ASA), acrylonitrile-styrene copolymer (SAN), methyl methacrylate acrylonitrile butadiene styrene copolymer (MABS), polystyrene (PS), methyl methacrylate styrene copolymer (MS), or a combination thereof.

In an embodiment of the invention, the second material includes poly(methyl methacrylate) (PMMA), polycarbonate, polypropylene, polyurethane, acrylonitrile styrene acrylate rubber copolymer (ASA), acrylonitrile-styrene copolymer (SAN), methacrylate acrylonitrile butadiene styrene copolymer (MABS), polystyrene (PS), methyl methacrylate styrene copolymer (MS), or a combination thereof.

In an embodiment of the invention, the method further includes, prior to performing the co-extrusion molding film process, providing a third material to a third screw of the co-extrusion blow molding machine, wherein the third material includes a color concentrate, a pigment, a pearl powder, or a combination thereof.

In an embodiment of the invention, the method further includes, prior to performing the co-extrusion molding film process, providing a fourth material to a fourth screw of the co-extrusion blow molding machine, wherein the fourth material includes an additive.

In an embodiment of the invention, the first material and a color concentrate, a pigment, a pearl powder, and additional additive auxiliaries may be blended prior to performing the co-extrusion molding film process, then they are subjected to a co-extrusion molding film process with the second material to form the composite layer structure.

In an embodiment of the invention, the method further includes, after performing the co-extrusion molding film process, forming a decorative layer on the composite layer structure, wherein a method for forming the decorative layer includes printing, spraying, electroplating, evaporation deposition, sputtering, or a combination thereof.

In an embodiment of the invention, the method further includes, after performing the co-extrusion molding film process, performing an in-mold decoration or an out mold decoration on the composite layer structure, so that the composite layer structure is attached onto an outer surface of a workpiece via an adhesive layer to form the decorated molding article.

In an embodiment of the invention, the performing the in-mold decoration on the composite layer structure includes: disposing the composite layer structure in an in-mold decoration mold having a mold cavity where the composite layer structure covers at least a portion of a surface of the mold cavity, heating for pre-molding and cutting excessive film materials; injecting a molding material into the in-mold decoration mold, so that the molding material and the composite layer structure are combined with each other; cooling the molding material; and taking the decorated molding article out from the in-mold decoration mold.

In an embodiment of the invention, the performing the out mold decoration on the composite layer structure includes: providing a workpiece; placing the workpiece and the composite layer structure in a fixture; performing a high pressure decorative molding process, so that the composite layer structure is attached onto the outer surface of the workpiece via the adhesive layer.

In an embodiment of the invention, the high pressure decorative molding process includes: performing a heating and softening step on the composite layer structure and cutting excessive film materials; contacting the composite layer structure with the workpiece and performing a pressurizing step; performing a high pressure vacuum molding step on the composite layer structure and the workpiece, so that the composite layer structure is attached onto the outer surface of the workpiece.

In view of the foregoing, the present invention combines a first layer and a second layer which have different materials to form a composite layer structure, so that the composite layer structure has both high hardness and high tensile properties. Various surface treatments, such as for adding gloss, matt, and geometric texture, may be performed on the composite layer structure by the pressure roller in the back end of the extrusion process, such that the composite layer structure is suitable for subsequent IMD or OMD. Further, the present invention provides a method for fabricating a decorated molding article, which may perform a dyeing treatment during the formation of the composite layer structure. Therefore, the composite layer structure may achieve decorative effects without an additional printing process, so as to reduce the costs and improve the yields.

BRIEF DESCRIPTION OF THE DRAWINGS

The features and advantages of the present invention set forth above will be described in view of the following examples with reference to the accompanying drawings.

DESCRIPTION OF THE EMBODIMENTS

The present invention is described more detailed hereinafter with reference to the accompanying drawings. However, the present invention may be embodied in a variety of ways and is not limited to the examples set forth herein. Spatially related terms used in the following examples, such as "upper," "lower," and the like, may refer to the orientations of the attached drawings, and are therefore intended for the purposes of illustration rather than limitation. Furthermore, thicknesses of layer s and regions in the drawings will be exaggerated for clarity. Same or like numeral references denote same or like elements, and the descriptions thereof will be omitted hereinafter.

Figure 1:
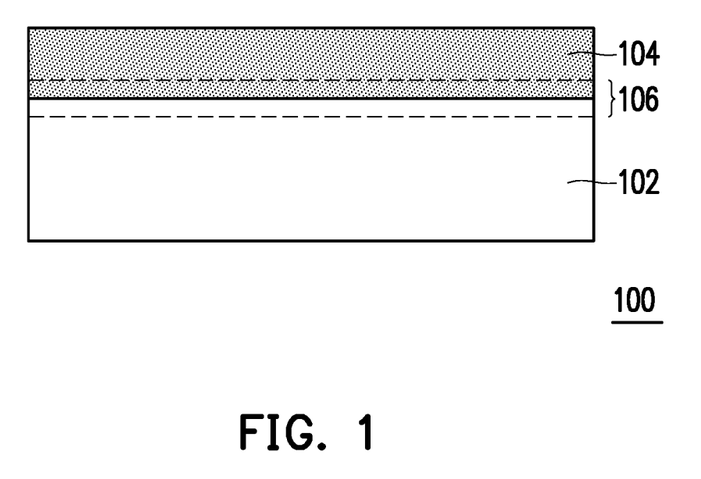
FIG. 1 is a schematic cross-sectional view showing a composite layer structure according to an embodiment of the present invention.

FIG. 1 is a schematic cross-sectional view showing a composite layer structure according to an embodiment of the present invention.

Referring to FIG. 1, an embodiment of the present invention provides a composite layer structure 100 which includes a first layer 102 and a second layer 104. The second layer 104 is disposed on the first layer 102. In an embodiment, a material of the first layer 102 includes acrylonitrile butadiene styrene copolymer, polycarbonate, polypropylene, polyurethane, acrylonitrile styrene acrylate rubber copolymer (ASA), acrylonitrile-styrene copolymer (SAN), methyl methacrylate acrylonitrile butadiene styrene copolymer (MABS), polystyrene (PS), methyl methacrylate styrene copolymer (MS), or a combination thereof. A material of the second layer 104 comprises poly(methyl methacrylate), polycarbonate, polypropylene, polyurethane, acrylonitrile styrene acrylate rubber copolymer (ASA), acrylonitrile-styrene copolymer (SAN), methacrylate acrylonitrile butadiene styrene copolymer (MABS), polystyrene (PS), methyl methacrylate styrene copolymer (MS), or a combination thereof. In this embodiment, the material of the first layer 102 is different from the material of the second layer 104. For example, the material of the first layer 102 may be acrylonitrile butadiene styrene copolymer (ABS) and the material of the second layer 104 may be poly(methyl methacrylate) (PMMA).

In an embodiment, the composite layer structure 100 is formed by a co-extrusion molding film process. Thus, a mixed region 106 is included between the first layer 102 and the second layer 104. The mixed region 106 includes a portion of the first layer 102 and a portion of the second layer 104. That is to say, the mixed region 106 includes both the material of the first layer 102 and the material of the second layer 104. For example, the mixed region 106 includes acrylonitrile butadiene styrene copolymer (ABS) and poly(methyl methacrylate) (PMMA). In some embodiments, acrylonitrile butadiene styrene copolymer and poly(methyl methacrylate) in the mixed region 106 may be mixed together. In an alternate embodiment, poly(methyl methacrylate) in the mixed region 106 may be disposed on the acrylonitrile butadiene styrene copolymer as well. A method for fabricating the composite layer structure 100 will be described in more details hereinafter and thus the related descriptions will be omitted.

In an embodiment, the first layer 102 of the composite layer structure 100 further includes a color concentrate, a pigment, a pearl powder or a combination thereof, such that the composite layer structure 100 has colorful, pearlescent, glossy, mirror-like or other visual effects. For example, the composite layer structure 100 may have decorative effects such as glossy black and electroplating silver. However, the present invention is not limited thereto. In other embodiments, the second layer 104 of the composite layer structure 100 may also include a color concentrate, a pigment, a pearl powder, or a combination thereof. In an alternate embodiment, both of the first layer 102 and the second layer 104 of the composite layer structure 100 may include a color concentrate, a pigment, a pearl powder, or a combination thereof. In another embodiment, the composite layer structure 100 may be a transparent composite layer structure as well.

In an embodiment, the composite layer structure 100 has a thickness of between 0.01 mm and 1 mm. In an alternate embodiment, the apparent surface gloss (i.e., the surface gloss measured by using a surface gloss meter at an angle of 60 degrees) of the composite layer structure 100 is about 80% or more. In other embodiments, the composite layer structure 100 has a density of about 1.06 g/ml or more. However, the present invention is not limited thereto. In other embodiments, the thickness, uniformity of brightness, density, and the like of the composite layer structure 100 may be adjusted depending on different materials thereof.

Figure 2:
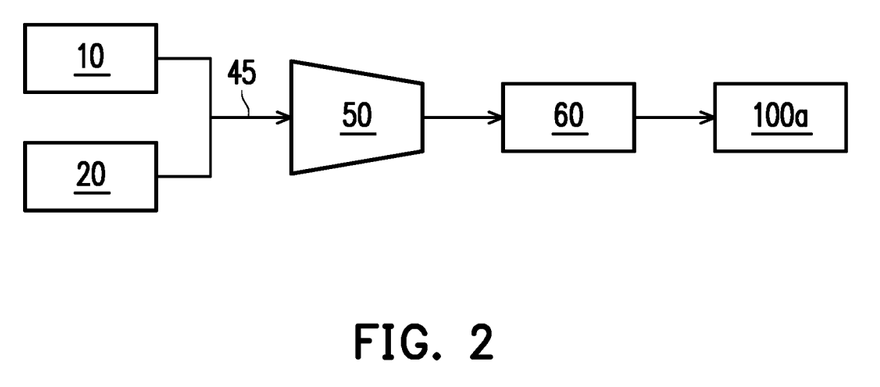
FIG. 2 is a process chart showing a method for fabricating a composite layer structure according to a first embodiment of the present invention.
Figure 3:
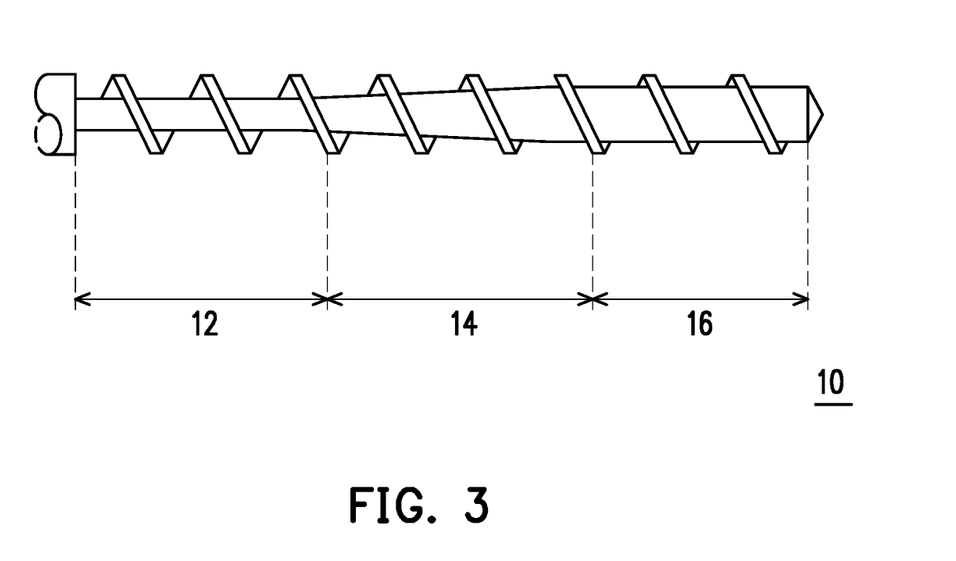
FIG. 3 is a schematic side view of a first screw of FIG. 2.

FIG. 2 is a process chart showing a method for fabricating a composite layer structure according to a first embodiment of the present invention. FIG. 3 is a schematic side view of a first screw of FIG. 2. The composite layer structure 100 of the present embodiment may be formed by a bi-layered or multi-layered co-extrusion blow molding machine, but the invention is not limited thereto.

Referring to FIG. 2, a first material is provided to a first screw 10 of the co-extrusion blow molding machine and a second material is provided to a second screw 20 of the co-extrusion blow molding machine. In an embodiment, the first material is used to form the first layer 102 of FIG. 1, which includes acrylonitrile butadiene styrene copolymer, polycarbonate, polypropylene, polyurethane, acrylonitrile styrene acrylate rubber copolymer (ASA), acrylonitrile-styrene copolymer (SAN), methyl methacrylate acrylonitrile butadiene styrene copolymer (MABS), polystyrene (PS), methyl methacrylate styrene copolymer (MS) or a combination thereof. The second material is used to form the second layer 104 of FIG. 1, which includes poly(methyl methacrylate), polycarbonate, polypropylene, polyurethane, acrylonitrile styrene acrylate rubber copolymer (ASA), acrylonitrile-styrene copolymer (SAN), methacrylate acrylonitrile butadiene styrene copolymer (MABS), polystyrene (PS), methyl methacrylate styrene copolymer (MS) or a combination thereof. In this embodiment, the first material is different from the second material. For example, the first material may be acrylonitrile butadiene styrene copolymer (ABS) and the second material may be poly(methyl methacrylate) (PMMA). In some embodiments, the first material is included in an amount of 70 wt % to 90 wt % and the second material is included in an amount of 20 wt % to 30 wt %, but the invention is not limited thereto.

Figure 4:
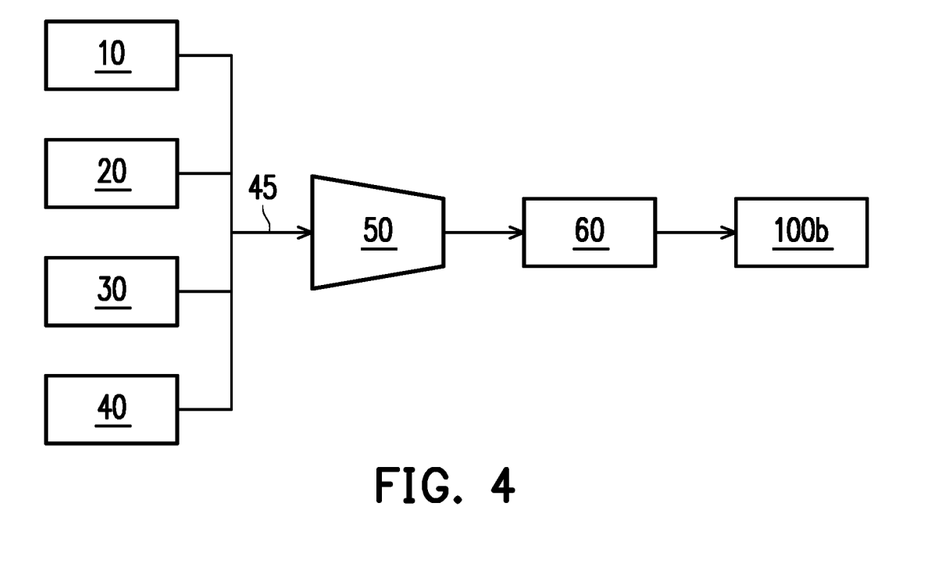
FIG. 4 is a flow chart showing a method for fabricating a composite layer structure according to a second embodiment of the present invention.

In an embodiment, the screw is a supply unit for melting the plastics in the extrusion process, and plays an essential role in the quality of the melted plastics. That is to say, the main functions of the screw are to melt the solid plastics, transfer the melted plastics, homogenize the plastics and provide the pressure required for the melted plastics extruding out of the die head. Specifically, as shown in FIG. 3, the first screw 10 may include a feeding section 12, a compression section 14, and a metering section 16 depending on the functions. Other screws 20, 30, 40 (as shown in FIG. 4) have the same functions, thus the descriptions thereof will be omitted.

In an embodiment, the feeding section 12 (also referred to as a solids transport section) is used to compress the solid plastic particles and push them forward smoothly. The conveying method in this section is transported by the drag and the guide of the screw. In other words, the difference between a frictional force of the plastics against the casing and a frictional force of the plastics against the surface of the screw is used to push the solid plastic particles (referred to the first material here) forward. The greater the difference between the frictional force of the plastics against the inner side of the casing and the frictional force of the plastics against the surface of the screw is, the greater the transportability is. In order to increase the frictional force of the plastics against the casting, the surface of the casting may be engraved with a plurality of longitudinal grooves parallel to the screw, such that the frictional force is significantly increased and the first material is pushed forward along the axial direction of the screw rather than twisted surrounding the screw, thereby improving the capability of the solids transport section.

In an embodiment, the compression section (also referred to as a melt section) 14 is located at the end of the feeding section 12 where the groove depth of the longitudinal groove gradually decreases along the direction of the screw. When the first material is transferred from the feeding section 12 to the compression section 14, the frictional heat of the solid particles of the first material and external heating cause the plastics begin to melt. The volume of the plastics is decreased while melting, so the depth of the groove needs to be reduced as well to match the decreased volume of the plastics. In addition, as the depth of the groove is reduced, the flow is constrained, so that the pressure in this area is gradually increased, thereby generating a pressurized effect on the first material.

In an embodiment, the metering section (also referred to as a melt transfer section) 16 is the last section in the first screw 10 that controls the flow. When the melt enters this section, it is thoroughly mixed and pressurized, so as to resist the back pressure of the die head at the front end of the first screw 10.

Referring back to FIG. 2, after providing the first material to the first screw 10 and providing the second material to the second screw 20, a co-extrusion molding film process 45 is performed, so that the first material and the second material are joined at the confluence section 50 and form a composite material. Next, the composite material may be formed into a composite layer structure 100a after stretching longitudinally and/or laterally through the stretching section 60. The configuration and material of the composite layer structure 100a are similar to those of the composite layer structure 100 of FIG. 1, thus the descriptions thereof will be omitted. In an embodiment, a further step between the confluence section 50 and the stretching section 60 includes a cooling and molding step.

In this case, the composite layer structure 100a of the first embodiment may be a transparent composite layer structure. However, the present invention is not limited thereto. In other embodiments, prior to the co-extrusion molding film process 45, the first material and a color concentrate, a pigment, a pearl powder, and additional additives may be blended to form a mixture. Next, the mixture and the second material are subjected to the co-extrusion molding film process 45 to form another composite layer structure, such that the composite layer structure has colorful, pearlescent, glossy, mirror-like, lusterless matte or other visual effects.

Further, after performing co-extrusion molding film process 45, various surface treatments (such as gloss, matt, and geometric texture) may be performed by the pressure roller in the back end of the extrusion process.

FIG. 4 is a flow chart showing a method for fabricating a composite layer structure according to a second embodiment of the present invention. The composite layer structure 100b of the second embodiment may have colouring effects. Detailed fabricating method thereof is set forth below.

Referring to FIG. 4, a first material is provided to a first screw 10 of a co-extrusion blow molding machine, and a second material is provided to a second screw 20 of the co-extrusion blow molding machine. The types and contents of first material and second material are described above, thus the descriptions thereof will be omitted. Further, the fabricating method of the second embodiment further includes providing a third material to a third screw 30 of the co-extrusion blow molding machine and providing a fourth material to a fourth screw 40 of the co-extrusion blow molding machine. In an embodiment, the third material includes a color concentrate, a pigment, a pearl powder or a combination thereof, to provide colorful, pearlescent, glossy, mirror-like or other visual effects. The fourth material may include an additive, such as a lubricant, a dispersant, an ultraviolet light absorber, an oxidation inhibitor, or a combination thereof.

As shown in FIG. 4, the first material, the second material, the third material, and the fourth material are subjected to a co-extrusion molding film process 45 to join at the confluence section 50 and form a composite material. Next, the composite material is formed into a composite layer structure 100b after stretching longitudinally and/or laterally through the stretching section 60. The configuration and material of the composite layer structure 100b are similar to those of the composite layer structure 100 of FIG. 1, thus the descriptions thereof will be omitted. It should be noted that, in the second embodiment, a dyeing process may be performed on the first layer (i.e. the first material) of the composite layer structure 100b during the co-extrusion molding film process 45, such that the composite layer structure 100b has colorful, pearlescent, glossy, mirror-like or other visual effects. Therefore, the composite layer structure 100b of this embodiment may achieve decorative effects without an additional printing process, so as to reduce the costs and improve the yields.

Although the embodiments of FIGS. 2 and 4 show methods for fabricating a composite layer structure with two layers, the invention is not limited thereto. In other embodiments, bi-layered or multi-layered co-extrusion blow molding machines may be used to form a composite layer structure with two or more layers.

Figure 5:
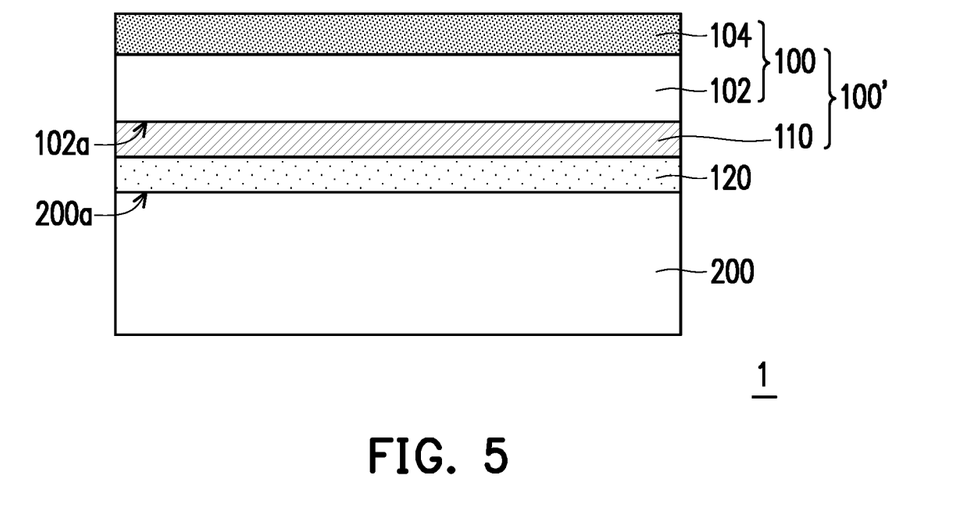
FIG. 5 is a schematic cross-sectional view showing a decorated molding article according to an embodiment of the present invention.

FIG. 5 is a schematic cross-sectional view showing a decorated molding article according to an embodiment of the present invention.

Referring to FIG. 5, this embodiment provides a decorated molding article 1, which includes a composite layer structure 100, a decorative layer 110, an adhesive layer 120, and a workpiece 200. The configuration and materials of the composite layer structure 100 have been described above and will be omitted hereinafter.

As shown in FIG. 5, the decorative layer 110 may be disposed on a surface 102a of the first layer 102 of the composite layer structure 100 to form a composite layer structure 100' which has the decorative layer 110. In an embodiment, when the composite layer structure 100 is a transparent composite layer structure, various visual effects may be attained by the decorative layer 110. However, the present invention is not limited thereto. In other embodiments, when the composite layer structure 100 has been dyed to have colorful, pearlescent, glossy, mirror-like or other visual effects, the decorative layer 110 may be omitted.

In an embodiment, the decorative layer 110 may be formed by printing, spraying, electroplating, evaporation deposition, sputtering, or a combination thereof. For example, the decorative layer 110 may be composed of a printing ink or a printable material, which may be a single ink layer, multiple ink layers, or a patterned ink layer for example, so as to present a single color, multiple colors or desired patterns respectively. The decorative layer 110 may increase the diversity of patterns and colors of the composite layer structure 100, so as to enrich the visual effects of the user or the viewer. In an alternate embodiment, the decorative layer 110 may be formed by gravure printing, screen printing, offset printing, reverse printing, inkjet printing, or any suitable printing method. In other embodiments, a material of the decorative layer 110 may include polyurethane (PU), polyacrylate, polyethylene terephthalate (PET), ethylene, propylene, polymer of higher olefins (polyolefin, PO), poly(methyl methacrylate) (PMMA), acrylonitrile styrene acrylic rubber copolymer (ASA), acrylonitrile-styrene copolymer (SAN), methyl methacrylate acrylonitrile butadiene styrene copolymer (MABS), polystyrene (PS), methyl methacrylate styrene copolymer (MS), or any suitable material, which may be mixed with an inorganic material.

As shown in FIG. 5, the composite layer structure 100' is attached onto an outer surface 200a of the workpiece 200 via the adhesive layer 120 to form the decorated molding article 1. In an embodiment, the adhesive layer 120 may be a hot melt adhesive, a UV-curing type adhesive, a light-curing type adhesive, an electron-curing type adhesive, or a combination thereof, for example. For example, a material of the adhesive layer 120 may include at least one of polyacrylate, polymethacrylate, polycarbonate, polyurethane, polyester, polyimide, epoxy resin, ethylene vinyl acetate copolymer (EVA), acrylonitrile butadiene styrene copolymer (ASA), acrylonitrile-styrene copolymer (SAN), methyl methacrylate acrylonitrile butadiene styrene copolymer (MABS), polystyrene (PS), methyl methacrylate styrene copolymer (MS), or a thermoplastic elastomer, or a copolymer, mixture or composite thereof.

Figure 6:
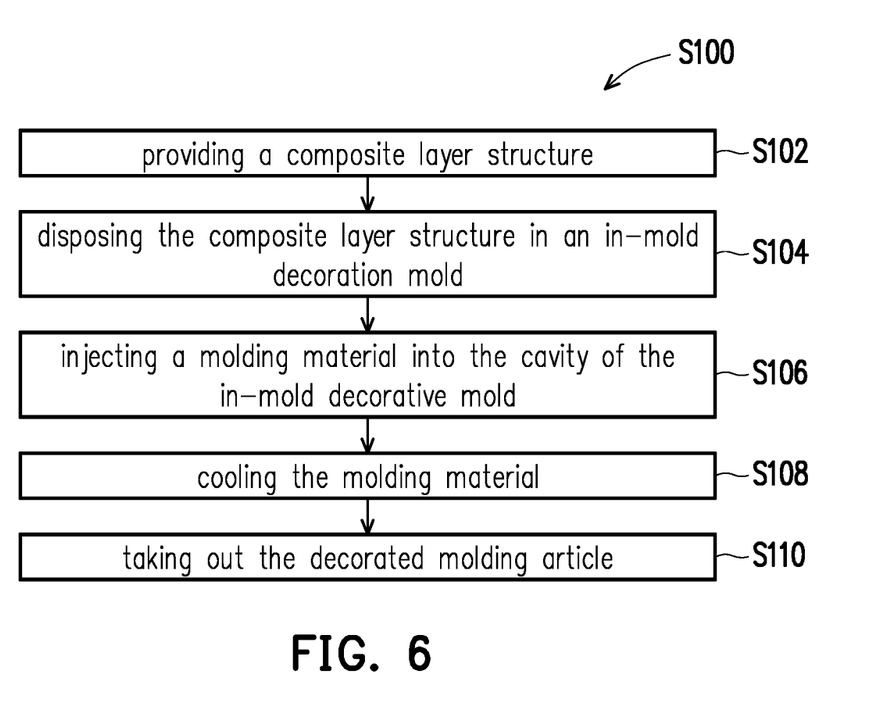
FIG. 6 is a flow chart showing the steps of a method for fabricating a decorated molding article in accordance with a third embodiment of the present invention.
Figure 7:
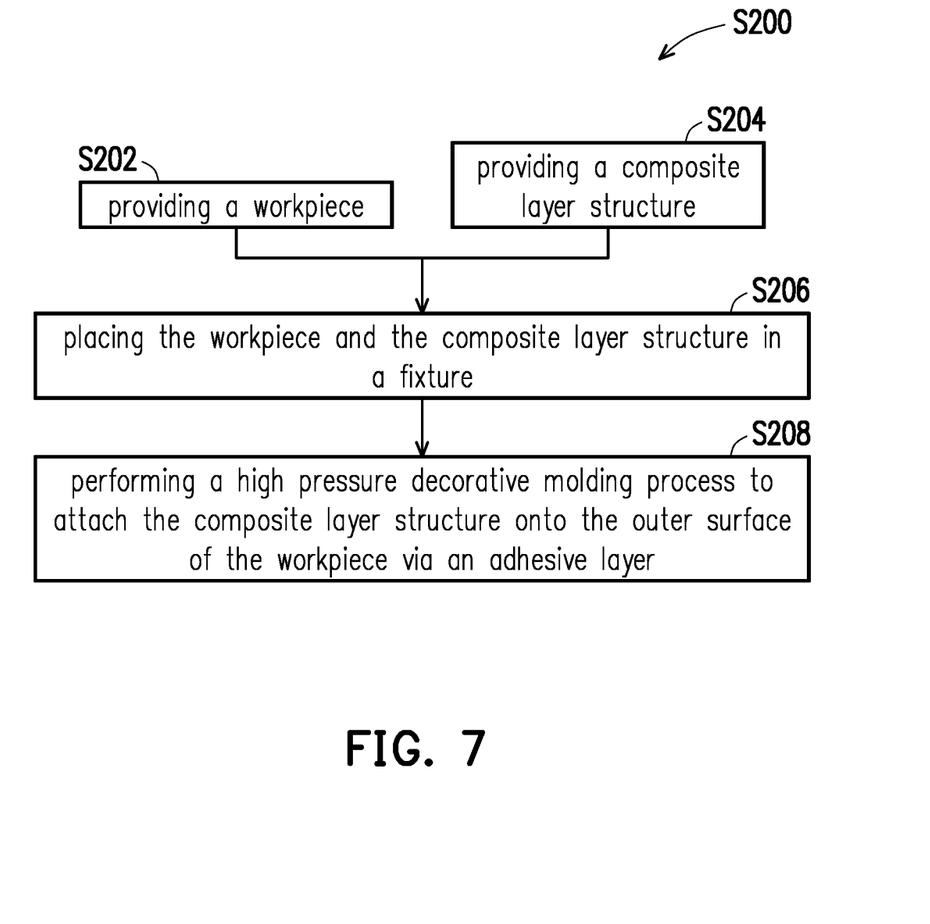
FIG. 7 is a flow chart showing the steps of a method for fabricating a decorated molding article in accordance with a fourth embodiment of the present invention.

FIG. 6 is a flow chart showing the steps of a method for fabricating a decorated molding article in accordance with a third embodiment of the present invention. FIG. 7 is a flow chart showing the steps of a method for fabricating a decorated molding article in accordance with a fourth embodiment of the present invention.

FIG. 5 shows that the composite layer structure 100 is attached onto the outer surface 200a of the workpiece 200 via the adhesive layer 120 to form the decorated molding article 1. The decorated molding article 1 may be manufactured by the fabricating method of FIG. 6 (which may be IMD, for example) or the fabricating method of FIG. 7 (which may be OMD, for example).

In detail, referring to FIG. 6, a flow chart of the steps S100 of a method for fabricating a decorated molding article of the first embodiment is as below. First, in the step S102, a composite layer structure is provided. The composite layer structure may be the composite layer structure 100 of FIG. 5 or the composite layer structure 100' having the decorative layer 110 (hereinafter simply referred to the composite layer structure 100). The composition of the composite layer structure 100 is described above, thus the descriptions thereof will be omitted.

Next, in the step S104, the composite layer structure 100 is disposed in an in-mold decoration mold. In detail, the in-mold decorative mold includes a hollow molding cavity. The molding cavity has a surface. Thereafter, the composite layer structure 100 is attached onto the surface of the molding cavity, such that the composite layer structure 100 covers at least a portion of the surface of the molding cavity. In an alternate embodiment, prior to step S106, a heating and pre-molding step may be optionally performed, and an excessive portion of the composite layer structure is removed by using die cutting, laser cutting, or water jet cutting.

Then, in the step S106, a molding material is injected into the molding cavity of the in-mold decorative mold, such that the molding material and the composite layer structure 100 are combined with each other. In an embodiment, the molding material may be a plastic material, a resin material, a metal material, a carbon fiber material, glass, or any suitable molding material.

Thereafter, in the step S108, the molding material is cooled to form the workpiece 200. Depending on the applications of the decorated molding article of the present invention, the workpiece 200 may be a housing or component of an electronic device, a housing or component of a vehicle, or a combination thereof. For example, the workpiece 200 may be a housing or component used in an electronic device, such as a mobile phone, a digital camera, a personal digital assistant (PDA), a laptop computer, a desktop computer, a touch panel, a television, a global positioning system (GPS) device, a car monitor, a navigator, a display, a digital photo frame, a DVD player, automotive interior trim panels (e.g., handles, trims, touchable front bumpers and the like), automotive exterior trim panels (e.g., exterior handles, back door trim strips and the like), an automotive dashboard, an automotive logo, an intelligent key (I-key), an engine start button, a clock, a radio, a toy, a watches, or other electronic devices that require electricity. However, the present invention is not limited to the shape and structure of the workpiece 200. Any workpiece 200 of which the shape and structure may be accomplished by IMD falls within the scope of this invention.

Next, in step S110, the decorated molding article 1 is taken out from the in-mold decorative mold. The obtained decorated molding article 1 is described above in FIG. 5 above, and will be omitted hereinafter.

On the other hand, the decorated molding article 1 may also be manufactured by OMD. Referring to FIG. 7, a flow chart of the steps S200 of a method for fabricating a decorated molding article of the second embodiment is as below. First, in the step S202, a workpiece 200 is provided. In an embodiment, depending on the applications of the decorated molding article of the present invention, the workpiece 200 may be a housing or component of an electronic device, a housing or component of a vehicle, or a combination thereof. In an alternate embodiment, a material of the outer surface 200a of the workpiece 200 may be plastics, resin, metal, carbon fiber, glass, or other molded casing material, and the workpiece 200 may be a workpiece which is suitably pre-treated to have the desired properties, for example. For example, when the material of the workpiece is plastics, a plastic workpiece (e.g., a plastics casing) may be obtained by an injecting process via an injecting mold; or, when the material of the workpiece is metal, a metal workpiece (e.g., a metal casing or the like) may be obtained by a metal surface treatment.

Next, in step S204, a composite layer structure is provided. The composite layer structure may be the composite layer structure 100 or the composite layer structure 100' having the decorative layer 110 as shown in FIG. 5 (hereinafter simply referred to as the composite layer structure 100), for example. The composition of the composite layer structure 100 is described above, thus the description thereof will be omitted.

Thereafter, in step S206, the workpiece 200 and the composite layer structure 100 are placed in a fixture. It should be noted that, prior to step S206, the fixture may optionally tailored depending on the demands of the final products and manufactured accordingly.

Then, in step S208, a high pressure decorative molding process is performed to attach the composite layer structure 100 onto the outer surface 200a of the workpiece 200 via an adhesive layer 120. Accordingly, the adhesive layer 120 is disposed between the decorative layer 110 and the workpiece 200. In detail, the high pressure decorative molding process includes firstly performing a heating and softening step on the composite layer structure 100, for example. In an embodiment, the temperature for the heating and softening step ranges from 80° C. to 150° C.; the duration for the heating and softening step ranges from 30 seconds to 180 seconds. Next, the composite layer structure 100 is in contact with the workpiece 200, and a pressurizing step is performed. Thereafter, a high pressure vacuum molding step is performed on the composite layer structure 100 is subjected, so as to attach the composite layer structure 100 onto the workpiece 200. Finally, a remaining composite layer structure may be optionally removed by die cutting, laser cutting, or water jet cutting. Briefly, in this embodiment, the composite layer structure 100 is adhered tightly onto the outer surface 200a of the workpiece 200 by OMD.

In view of the foregoing, the present invention combines a first layer and a second layer which have different materials to form a composite layer structure, such that the composite layer structure has both high hardness and high tensile properties suitable for subsequent IMD or OMD. Further, the present invention provides a method for fabricating a decorated molding article, which may perform a dyeing treatment during the formation of the composite layer structure. Therefore, the composite layer structure may achieve decorative effects without an additional printing process so as to reduce the costs and improve the yields.

Although the invention is disclosed with reference to the above embodiments, it will be apparent to one of ordinary skill in the art that modifications and alterations thereof may be made without departing from the spirit and scope of the invention. Thus, the scope of the invention should be defined by the appended claims and their equivalents.

What is claimed is:

1. A method for fabricating a decorated molding article comprising:
    providing a first material to a first screw of a co-extrusion blow molding machine, wherein a first material comprises acrylonitrile butadiene styrene copolymer;
    providing a second material to a second screw of the co-extrusion blow molding machine, wherein the second material comprises poly(methyl methacrylate);
    performing a co-extrusion molding film process, so that the first material and the second material are extruded to form a composite layer structure comprising a first layer and a second layer disposed on the first layer;
    after performing the co-extrusion molding film process, forming a decorative layer on the composite layer structure;
    after forming a decorative layer, performing an in-mold decoration or an out-mold decoration on the composite layer structure, so that the composite layer structure is attached onto an outer surface of a workpiece via an adhesive layer to form the decorated molding article,
    wherein the first material is 70 wt % to 80 wt %, and the second material is 20 wt % to 30 wt %, based on a total weight of the first material and the second material,
    wherein the first layer is consisting essentially of the first material, the second layer is consisting essentially of the second material, a mixed region is included between the first layer and the second layer, and the mixed region is consisting essentially of the first material and the second material,
    wherein the composite layer structure has a thickness of between 0.01 mm and 1 mm,
    wherein the decorative layer is disposed between the composite layer structure and the adhesive layer.

2. The method for fabricating the decorated molding article of claim 1, wherein the first material further comprises polycarbonate, polypropylene, polyurethane, acrylonitrile styrene acrylate rubber copolymer, acrylonitrile-styrene copolymer, methyl methacrylate acrylonitrile butadiene styrene copolymer, polystyrene, methyl methacrylate styrene copolymer, or a combination thereof.

3. The method for fabricating the decorated molding article of claim 1, wherein the second material further comprises polycarbonate, polypropylene, polyurethane, acrylonitrile styrene acrylate rubber copolymer, acrylonitrile-styrene copolymer, methyl methacrylate acrylonitrile butadiene styrene copolymer, polystyrene, methyl methacrylate styrene copolymer, or a combination thereof.

4. The method for fabricating a decorated molding article of claim 1, further comprising, prior to performing the co-extrusion molding film process, providing a third material to a third screw of the co-extrusion blow molding machine, wherein the third material comprises a color concentrate, a pigment, a pearl powder, or a combination thereof.

5. The method for fabricating a decorated molding article of claim 1, further comprising, prior to performing the co-extrusion molding film process, providing a fourth material to a fourth screw of the co-extrusion blow molding machine, wherein the fourth material comprises an additive.

6. The method for fabricating a decorated molding article of claim 1, wherein a method for forming the decorative layer comprises printing, spraying, electroplating, evaporation deposition, sputtering, or a combination thereof.

7. The method for fabricating a decorated molding article of claim 1, wherein the performing the in-mold decoration on the composite layer structure comprises:
    disposing the composite layer structure in an in-mold decoration mold having a mold cavity, wherein the composite layer structure covers at least a portion of a surface of the mold cavity;
    injecting a molding material into the in-mold decoration mold, so that the molding material and the composite layer structure are combined with each other;
    cooling the molding material; and
    taking the decorated molding article out from the in-mold decoration mold.

8. The method for fabricating a decorated molding article of claim 1, wherein the performing the out mold decoration on the composite layer structure comprises:
    providing a workpiece;
    placing the workpiece and the composite layer structure in a fixture; and
    performing a high pressure decorative molding process, so that the composite layer structure is attached onto the outer surface of the workpiece via the adhesive layer.

9. The method for fabricating a decorated molding article of claim 8, wherein the high pressure decorative molding process comprises:
    performing a heating and softening step on the composite layer structure;
    contacting the composite layer structure with the workpiece, and performing a pressurizing step; and
    performing a high pressure vacuum molding step on the composite layer structure and the workpiece, so that the composite layer structure is attached onto the outer surface of the workpiece.

* * * * *